Figure 5:
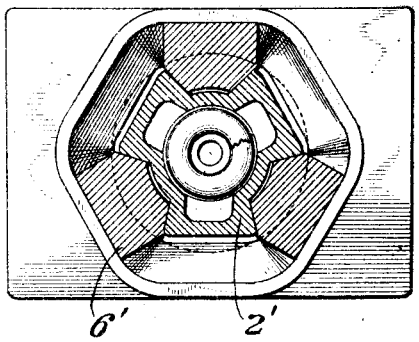

W. BLACKMORE.
FRICTION DRAFT RIGGING.
APPLICATION FILED JUNE 6, 1914.
1,192,266.
Patented July 25, 1916.
2 SHEETS—SHEET 1.
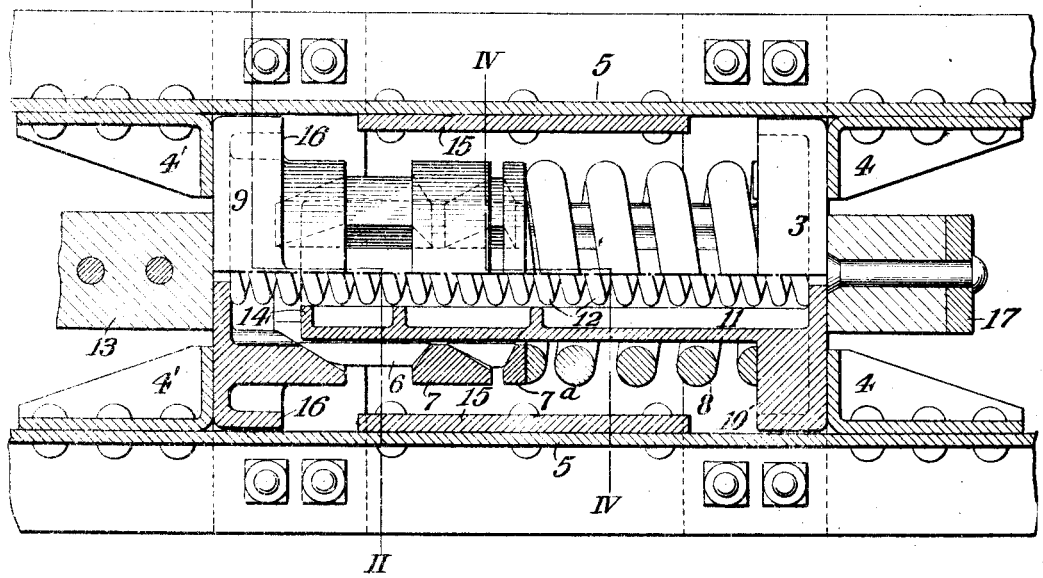
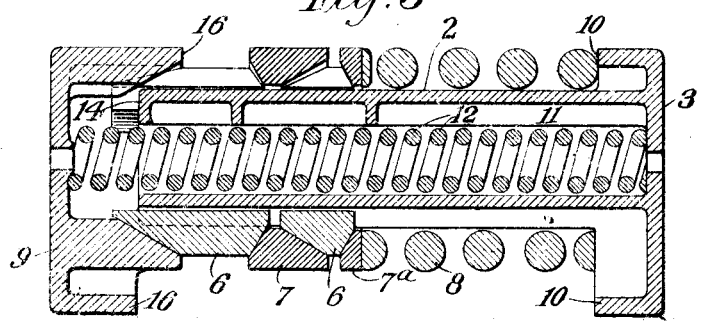
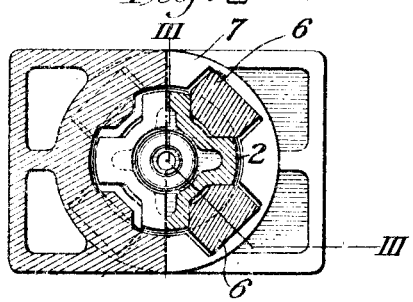
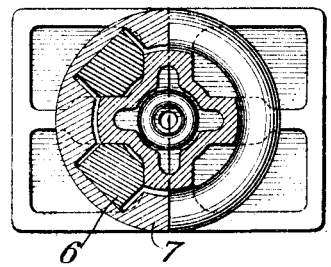
Witnesses:
Raphael Netter
C. L. Morrill
Inventor
William Blackmore
By his Attorney
Clarence Strand

W. BLACKMORE.
FRICTION DRAFT RIGGING.
APPLICATION FILED JUNE 6, 1914.

1,192,266.

Patented July 25, 1916.
2 SHEETS—SHEET 2.

Witnesses:

Inventor
William Blackmore
By his Attorney

UNITED STATES PATENT OFFICE.

WILLIAM BLACKMORE, OF CLEVELAND, OHIO, ASSIGNOR TO THE NATIONAL MALLEABLE CASTINGS COMPANY, OF CLEVELAND, OHIO, A CORPORATION OF OHIO.

FRICTION DRAFT-RIGGING.

1,192,266.   Specification of Letters Patent.   Patented July 25, 1916.

Application filed June 6, 1914. Serial No. 843,422.

*To all whom it may concern:*

Be it known that I, WILLIAM BLACKMORE, a citizen of the United States, residing at Cleveland, Cuyahoga county, Ohio, have invented new and useful Improvements in Friction Draft-Rigging, of which the following is a specification, reference being had to the accompanying drawings, in which—

Figure 1 is a plan, partly in section, of my improved rigging, showing its application to the sills of the car; Fig. 2 is a section along lines II—II of Fig. 1; Fig. 3 is a section along the lines III—III of Fig. 2; Fig. 4 is a section along the lines IV—IV of Fig. 1; and Fig. 5 illustrates a modified form of my device.

My invention relates to friction draft rigging of the type in which the frictional elements are comprised of a plurality of friction shoes arranged about a central friction member, and consists in the elimination of the usual casing and in a novel releasing mechanism.

My invention also consists in the construction and operation of the parts which I shall hereinafter describe and claim.

Referring to the drawings, 2 indicates a central friction member, preferably formed at its rear end into an enlarged plate or base 3, of rectangular shape, which is designed to abut against the rear draft sill stops 4, which are attached to the draft sills 5 of the car structure. The central friction member has the usual friction shoes 6 bearing in its reëntrant angles, and the wedges 7 bear against the friction shoes, forcing them inwardly against the central friction member. The rearmost wedge 7ª bears against the compression spring 8, and the foremost wedge is preferably made integral with the front follower 9, which bears against the front draft sill stops 4'. The compression spring 8 surrounds the central friction member 2 and is held in position thereby, and it is seated at its rear end against the forward face 10 of the plate or base 3. The central friction member 2 has a central longitudinal recess 11, open on its forward side, adapted for reception of a release spring 12. The release spring 12 reacts at its rear end against the plate or base 3 of the central friction member 2, and at its forward end against the front follower 9.

The operation of my device is as follows: In buffing, when the coupler receives a buffing shock, this shock is transmitted through the coupler butt 13 and the front follower 9, through the various wedges 7, 7ª and friction shoes 6 to the compression spring 8, which bears against the base 3 of the friction member. The front follower 9 is so arranged that it will strike the forward end 14 of the central friction member 2 at the end of the travel of the device, and just before its parts go solid. Additional stops 15 are provided, which may be secured to the draft sills 5, against which the rear face 16 of the front follower 9 or the forward face 10 of the base 3, will bear in buffing or draft, as the case may be.

After the stresses of buffing or draft have ceased, the release spring 12 reacting against the front follower at one end and the base of the central friction member at the other, thereby relieves the wedging engagement between the foremost wedge and its set of shoes, and also exerts pressure against the front follower 9 and the coupler 13 to push them out of the way and so permit the compression spring 8 to restore the wedges 7 and 7ª and shoes 6 to their initial position in the device.

My device is of great advantage, since it provides a rigging of light weight and one of very simple and strong construction. The device is inclosed directly by the yoke 17, which engages the front follower 9 and the base 3, and as the central friction member 2 supports the compression and releasing springs 8 and 12, the shoes 6 and the wedges 7, and as the foremost set of shoes 6 has a supporting engagement with the foremost wedge, which I have shown as being integral with the front follower, the frictional and spring parts of the device are self-supporting and the usual casing is thus unnecessary. The position of the release spring 12 is of especial advantage, since it enables the releasing to be done by a single spring and provides a container for the spring 12 within the friction elements.

Fig. 5 illustrates a modified form of my device in which I have shown three friction shoes 6', in each set, bearing against the central friction member 2' instead of having four shoes in each set as shown in Figs. 1–4.

It is obvious that various modifications may be made in the shock-absorbing mechanism which I have shown and described herein, without departing from my invention.

What I claim is:

1. In frictional shock absorbing mechanism, a central friction member having a broad flat base of resistance and a plurality of outwardly-radiating arms having friction faces on their sides forming with each other reëntrant angles, a plurality of friction shoes, each seating against the sides of a reëntrant angle, a wedge in engagement with said shoes, the wedge being integral and encircling said friction member, a compression spring encircling said friction member bearing at one end against said base and at the other end against a follower, said follower encircling said friction member, and a releasing spring centrally contained in said friction member and bearing at its outer end against said wedge.

2. In frictional shock absorbing mechanism, a central friction member having a broad flat base of resistance and a plurality of outwardly-radiating arms, said arms having friction faces forming with each other reëntrant angles, a plurality of friction shoes, each shoe bearing against the friction faces of a plurality of said arms, a wedge in engagement with said shoes, the wedge being integral and encircling said friction member, a compression spring encircling said friction member and bearing at one end against said base and at the other end against an intermediate follower, said follower encircling said friction member, and a releasing spring having a bearing on said friction member at one end and at its other end against said wedge.

3. In frictional shock absorbing mechanism, a follower having integral therewith a longitudinally-extending stem comprising a central friction member cruciform in cross section, a plurality of friction shoes, each seating in a reëntrant angle of the central friction member, a second follower in engagement with said shoes, the said second follower being integral and encircling said friction member, a compression spring encircling said friction member and bearing at one end against the said first follower and at the other end against an intermediate follower, said intermediate follower encircling said friction member, and a releasing spring inclosed in the central friction member and engaging said second follower.

WILLIAM BLACKMORE.

Witnesses:
  HARRY E. ORR,
  HUBERT L. SPENCE.